(12) United States Patent
Ogino et al.

(10) Patent No.: US 7,341,441 B2
(45) Date of Patent: Mar. 11, 2008

(54) NANOPRINT EQUIPMENT AND METHOD OF MAKING FINE STRUCTURE

(75) Inventors: Masahiko Ogino, Hitachi (JP); Akihiro Miyauchi, Hitachi (JP); Shigehisa Motowaki, Hitachi (JP); Kosuke Kuwabara, Hitachi (JP)

(73) Assignee: Hitachi Industries Co., Ltd., Tokyo (JP)

( * ) Notice: Subject to any disclaimer, the term of this patent is extended or adjusted under 35 U.S.C. 154(b) by 206 days.

(21) Appl. No.: 10/804,101

(22) Filed: Mar. 19, 2004

(65) Prior Publication Data

US 2004/0183236 A1    Sep. 23, 2004

(30) Foreign Application Priority Data

Mar. 20, 2003   (JP)   ............... 2003-077927

(51) Int. Cl.
*B29C 59/04*   (2006.01)
(52) U.S. Cl. .............. 425/385; 425/411; 977/887
(58) Field of Classification Search ........... 425/385, 425/406, 411, 577; 977/887
See application file for complete search history.

(56) References Cited

U.S. PATENT DOCUMENTS

| | | | | |
|---|---|---|---|---|
| 3,737,274 A | * | 6/1973 | Coffin et al. | 425/364 R |
| 4,244,683 A | * | 1/1981 | Rowland | 425/143 |
| 5,256,962 A | | 10/1993 | Munniksma et al. | 324/133 |
| 5,324,188 A | * | 6/1994 | Santoh et al. | 425/363 |
| 5,772,905 A | | 6/1998 | Chou | 216/44 |
| 2005/0082698 A1 | * | 4/2005 | Gutman et al. | 264/1.33 |

* cited by examiner

*Primary Examiner*—Yogendra N. Gupta
*Assistant Examiner*—Emmanuel S Luk
(74) *Attorney, Agent, or Firm*—Antonelli, Terry, Stout & Kraus, LLP.

(57) ABSTRACT

Provided is a nanoprint apparatus in which a substrate and a mold formed on its surface with fine concavities and convexities are heated and pressed with each other through the intermediary of a buffer member interposed therebetwen, including a mechanism for successively replacing the buffer member with new one at each time which the mold and the substate are heated and pressed, thereby it is possible to form a fine structure on the substrate.

6 Claims, 11 Drawing Sheets

FIG.4a
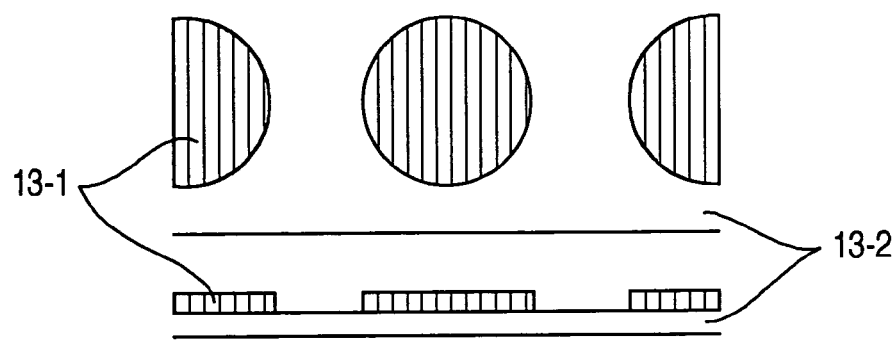
FIG.4b
FIG.5
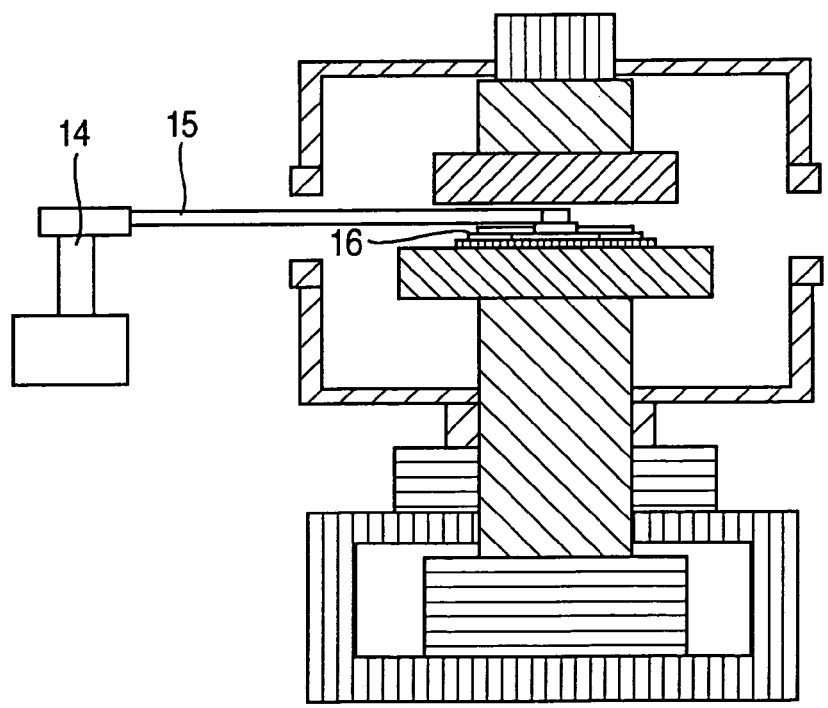

EXTERNAL MICROSCOPIC PHOTOGRAPH          ENLARGED MICROSCOPIC PHOTOGRAPH

NANOPRINT EQUIPMENT AND METHOD OF MAKING FINE STRUCTURE

BACKGROUND OF THE INVENTION

The present invention relates to a nanoprint apparatus for making a fine structure on a substrate with the use of a mold having a heating and pressing mechanism, and also to a method of making a fine structure.

These years, microfabrication for semiconductor integrated circuits has been progressed and the degree of integration of semiconductor integrated circuits has been enhanced, and accordingly, the accuracy of photolithography apparatuses for the lithography of pattern transcription which carries out the microfabrication. The lithography has approached the limits of its ability since features in a pattern to be fabricated become extremely fine up to wavelengths of light sources for optical exposure. Thus, in order to fabricate a fine structure having higher integration with a high degree of accuracy, it has been attempted to use an electron beam drawing apparatus which is one kinds of charged particle beam apparatuses, instead of the lithography apparatuses.

The formation of a pattern with the use of an electron beam utilizes a method of drawing a mask pattern, instead of a batch image-transcription for fabricating a pattern with the use of a light source of i-ray beam, excimer laser or the like, the larger the number of patterns to be drawn, the longer the exposure time, there is caused a such a deficiency that the longer the exposure time, a relative long time is required for the fabrication of a pattern. Thus, should the degree of integration be leaped up to 256 Mega, 1 Giga or 4 Giga, a problem of remarkably lowering throughput would be caused. Thus, for the purpose of speed-up of the electron beam drawing apparatuses, there has been tried the development of a batch pattern irradiating process in which an electron beam is irradiated to a combination of masks of various configurations in a batch in order to obtain an electron beam having a complicated configuration. As a result, should the degree of fineness of patterns be heightened, the electron beam drawing apparatus would be large-sized while a mechanism for controlling the position of a mask with a relatively high degree of accuracy would be required. Thus, there has been caused such a problem of increasing the cost of the apparatus.

For example, U.S. Pat. Nos. 5,256,962, 5,772,905 and Appl. Physics, Letter Vol, 67, P3314(1955), authed by S. Y. Chou et al, disclose a technology for fabricating a fine pattern at a low cost. In this technology, a mold having concavities and convexities defining a predetermined pattern the same as that to be formed on a substrate to be image-transferred is pressed against a resist film layer formed on the surface of a substrate. In particular, a nanoprint technology disclosed in the U.S. Pat. No. 5,772,905 or Appl., Physics, Letter utilizes a mold formed of a silicon wafer for fabricating a fine structure of not greater than 25 nanometer through image-transcription.

However, there has been desired a technology of transcription a fine pattern with a high degree of accuracy with the use of an imprint process capable of fabricating a fine pattern.

After various studies, the applicants have found such a fact that should heating and pressing of a substrate and a mold be not uniform, no precise imager transcription could be carried out, and have been devised the present invention.

SUMMARY OF THE INVENTION

In view of the above-mentioned technical tasks, an object of the present invention is to provide a nanoprint technology for fabricating a fine structure on a substrate, which is capable of transferring a pattern with a higher degree of accuracy in a manufacturing process for semiconductor devices.

To the end, according to a first aspect of the present invention, there is provided a nanoprint apparatus for heating and pressing a substrate and a mold formed on its surface with a fine concave and convex structure, through the intermediary of a buffer material, characterized in that after heating and pressing, the buffer material is successively replaced with another one.

It is preferable to set the size of the buffer materials to be larger than the area of a pattern forming area of the mold, but smaller than the external shape of the substrate and the external shape of the mold so as to allow the heating and pressing to be uniform.

According to a second aspect of the present invention, there is provided an image transfer method using a nanoprint apparatus, in which a substrate, a mold formed on its surface with a fine concave and convex structure are used for forming a fine structure on the substrate, characterized in that a plurality of buffer materials which are held on a conveying film are used so that they are successively replaced with one another during heating and pressing.

Similar to the first aspect of the present invention, the buffer materials are greater than a pattern forming area of the mold, but smaller than the external shape of the substrate and the external shape of the mold so as to allow heating and pressing to be uniform.

It is noted here that a method of forming a resin substrate or a resin film of the substrate, is preferably the one selected from of the group consisting of a process in which a resin substrate or a resin film on a substrate is heated so as to deform the same, a process in which a resin substrate or a resin film on a substrate is pressed and photo-cured, and a process in which a resin substrate or a resin film on a substrate is photo-cured is selected.

Explanation will be made of the present invention with reference to the accompanying drawings in which:

Other objects, features and advantages of the invention will become apparent from the following description of the embodiments of the invention taken in conjunction with the accompanying drawings.

BRIEF DESCRIPTION OF SEVERAL VIEWS OF THE DRAWING

FIGS. 1a to 1d are schematic views for explaining process steps of nanoprinting;

FIGS. 4a to 4b are a top view and side view illustrating a two layer structure composed of a transfer film and buffer areas formed the former;

FIG. 5 is a sectional view illustrating a nanoprint apparatus provided with an automatic buffer replacing mechanism;

FIGS. 13a to 13l are views for explaining process steps of forming an external layer wiring substrate;

DETAILED DESCRIPTION OF PREFERRED EMBODIMENTS OF THE INVENTION

Figure 1A:
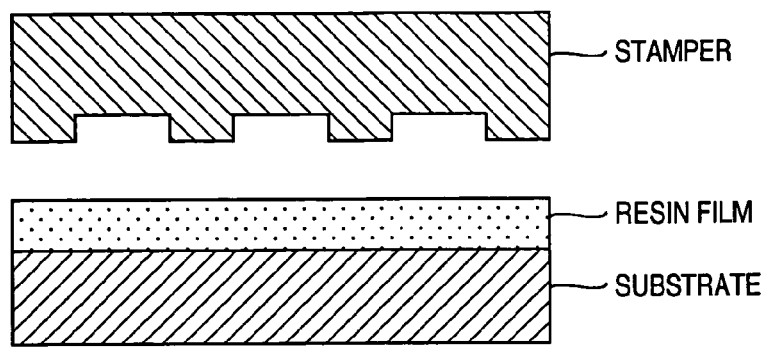
Figure 1D:
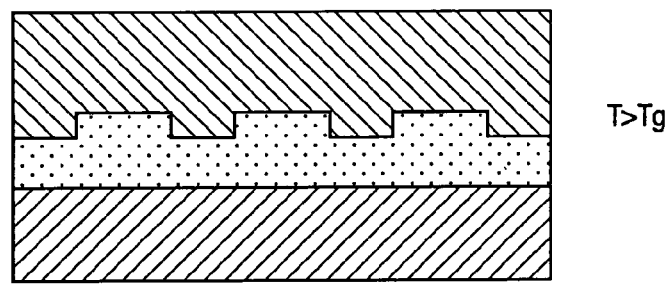
Figure 1D:
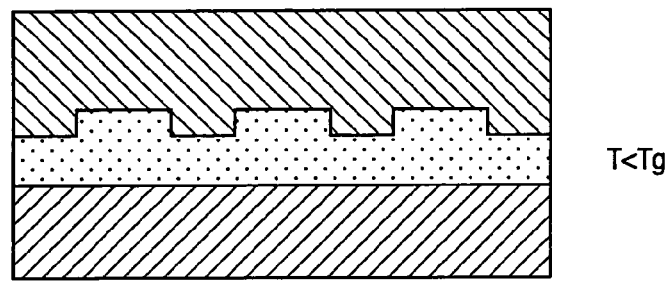
Figure 1D:
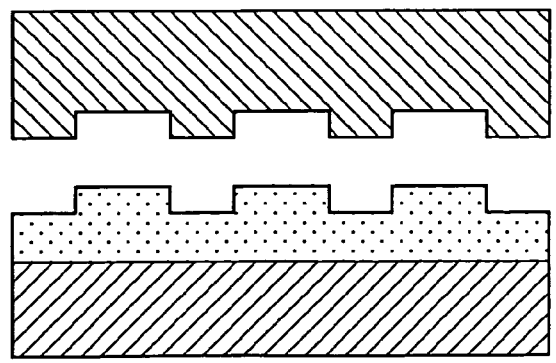

At first, explanation will be hereinbelow made of a nanoprint process while referring to FIGS. 1a to 1d. A mold having a fine pattern formed on a surface of a silicon substrate or the like is prepared. A resin film is formed on a substrate other than the above-mentioned substrate (FIG. 1a). With the use of a press machine having a heating and pressing mechanism which is not shown, the staper is pressed against the resin film under a predetermined pressure at a temperature not less than a glass transition temperature (Tg) of the resin film (FIG. 1b). Then, the resin film is cooled and cured (FIG. 1c). The mold and the substrate are separated from each other so that the fine pattern on the mold has been transferred onto the resin film on the substrate (FIG. 1d). Further, instead of the step of heating and pressing, photo-curable resin may be used, and after stamping, light is irradiated thereon so as to cure the resin. Further, a light transparent mold made of glass or the like may be used, and after pressing, light is irradiated above the mold so as to photo-cure the resin.

With the use of the nanoprinting method, there can be offered the following advantages: (1) an integrated ultra-fine pattern can be efficiently transferred; (2) The installation cost is low, (3) complicated configuration can be accepted so that the formation of pillars can be made and so forth.

In applicable fields of the nanoprint, it may be applied to (1) various bio-devices such as DNA chips, immunoassay chips or a thrown-away DNA chips in particular, (2) semiconductor multi-layer wiring, (3) print circuitboards and RF MEMS, (4) optical or magnetic storage, (5) optical devices such as wave guides, diffraction gratings, microlenses or polarizers or photonic crystals, (6) Sheet, (7) LED displays, and (8) FED displays, and the like.

In the present invention, the nanoprint is directed to transcriptions in a range from several 100 μm to several nm.

In the present invention, the pressing machine perferably has a heating and pressing mechanism or a mechanism for irradiating light above a light transparent mold in order to efficiently carry out pattern transcription.

In the present invention, the mold has a fine pattern to be transferred, no limitation should be made to the process of forming the pattern in the mold. For example, photolithography, an electron beam drawing process or the like may be selected in view of a desired degree of processing accuracy. As the material of the mold, there may be enumerated a silicon wafer, various metal materials, glass, ceramic, plastic or the like, having a high degree of strength and a required degree of workability. Specifically, there may be preferably enumerated Si, Sic, SiN, polycrystal Si, glass, Ni, Cr, Cu and a substance containing one of aforementioned materials.

In the present invention, no particular material is specified as a material of the substrate. Any material having a predetermined strength may be used. Specifically, there may be preferably enumerated silicon, various kinds of metals, glass, ceramic, plastic and the like.

In the present invention, no particular material is specified as the material of the the resin film to be transferred thereon with a fine structure. However, it may be selected in view of a desired degree of processing accuracy. Specifically, there may be used, for example, thermoplastic resin such as polyethylene, polypropylene, polyvinyl alcohol, polyvinylidene chrolide, polyethylene terephthalate, polyvinyl chloride, polystyrene, ABS resin, AS resin, acrylic resin, polyamide, polyacetal, polybutyrene terephthalate, glass reinforced polyethylene terephthalate, polycarbonate, modified polyphenylene terephthalate, polyphenylene sulfide, polyether etherketon, liquid crystaline polymer, fluoropoastic, polyacrylate, polysulfone, polyether sulfone, polyamide imido, polyether imido, or thermoplastic polyimido, thermosetting resin such as phenol resin, melamine resin, urea-formaldehyde resin, epoxy resin, unsaturated polyester resin, alkyd resin, silicon resin, polydiallyl phthalate resin, or polyamide-bis-maleimido, polybis-amidotiazole, or a material in which not less than two kinds of the former resins are blended.

Embodiments

Figure 2:
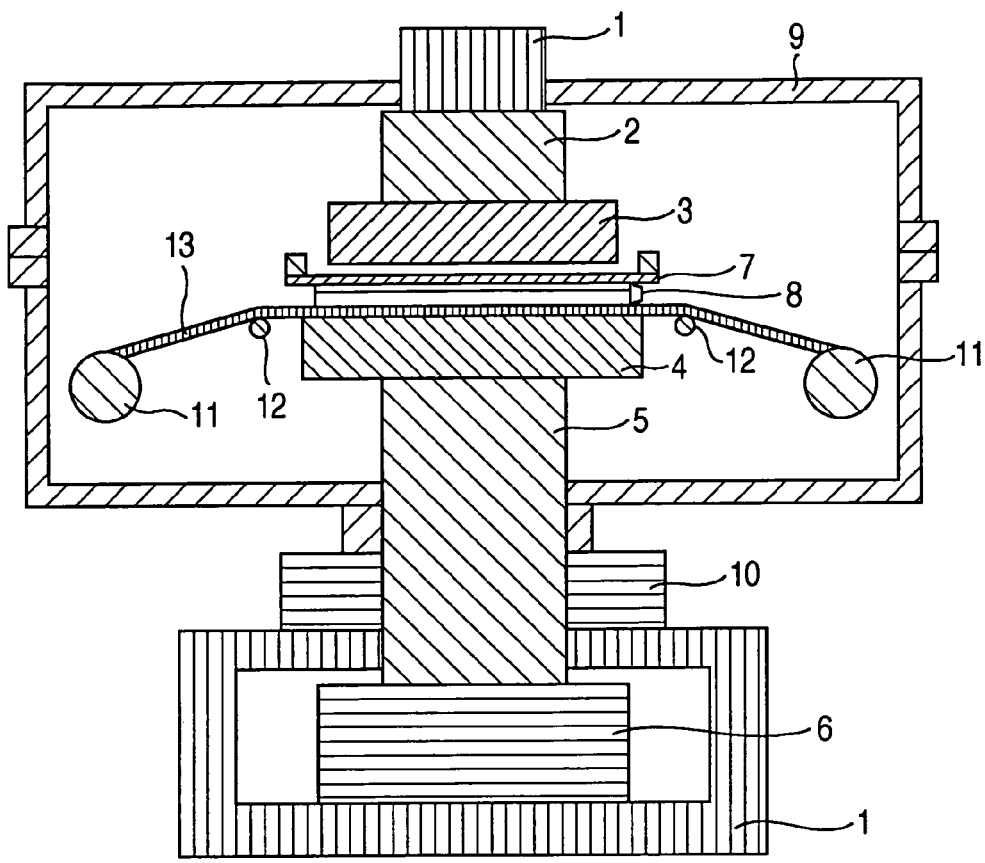
FIG. 2 is a sectional view illustrating a nanoprint apparatus provided with a mechanism for successively replacing buffer materials.

Explanation will be hereinbelow made of embodiments of the present invention with reference to the accompanying drawing. Referring to FIG. 2, a nanoprint apparatus incorporated therein with a mechanism for successively replacing buffer members, and a fine structure transcription method, in an embodiment of the present invention, will be explained. It is noted here that FIG. 2 is a conceptual view in which a pattern configuration is depicted, being simplified and enlarged. The nanoprint apparatus will be briefly explained. There are shown in FIG. 2, a frame 1 of an apparatus body, and a head leveling mechanism 2 serving to adjusting a head 3 so that the head makes contact with a stage 4 in parallel therewith, the head 3 being circular, having a press surface with a diameter of 6 in., and fixed to the frame 1 through the intermediary of the head leveling mechanism 2, further, the head 3 having a heating and cooling mechanism for controlling the temperature of the head 3 in a range from a room temperature to 300 deg.C. The stage 4 carries thereon a sample, having a circular shape with a diameter of 6 in, and the stage 4 can be heated and cooled so that the temperature thereof is controlled to any value in a range from a room temperature to 300 deg.C., similar to the head 3. Further, it is formed in its outer surface with a vacuum chuck for fixing a substrate. This stage 4 is connected to a stage pressing mechanism 6 through the intermediary of a support member 5 so as to heat and press a mold 7 formed therein a fine structure, and a sample 8. The stage pressing mechanism 6 pneumatically produces a thrust of 7,000 kgf at maximum.

The pressure value and the pressing time of this thrust can be controlled by an external controller.

The stage 4 and the head 3 of the apparatus are accommodated in a vacuum chamber 9 which is made of SUS, and composed of two portions, and which is opened and closed by a vacuum chamber opening and closing mechanism 10 when the sample is to be taken into and out. Further, the vacuum chamber is connected to a vacuum pump so as to be evacuated up to 0.1 torr. Further, in the nanoprint apparatus, a buffer member 13 is interposed between the sample 8 and the stage 4 which are therefore uniformly pressed. This buffer member 13 has been previously wound on an automatic conveying roller 11 so as to travel over the stage 4 by way of a roller guide 12 in order to be successively replaced with one another each time when the transcription is completed.

Figure 3:
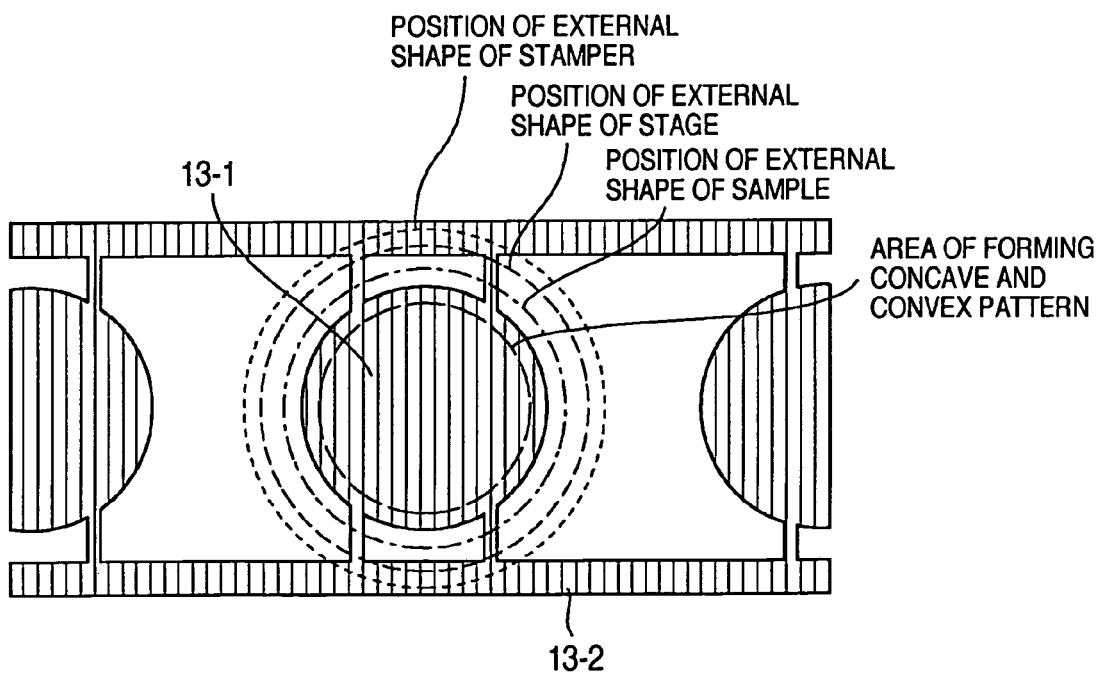
FIG. 3 is a top view illustrating the nanoprint device shown in FIG. 2.

FIG. 3 is a schematic view illustrating the buffer member 13 as view from the above. The buffer member 13 formed of a long polyimide film (Yupirex produced by Ube Kosan Co., ltd.) having a thickness of 50 μm, a width of 30 cm and a length of 50 m, and is composed of buffer zones 13-1 each larger than a pattern concave and convex area but smaller than the external shape of the sample, the external shape of the stage and external shape of the mold, and a buffer guide zone 13-2 for holding and automatically conveying the buffer zones. In this example, although the polyimide film is used for the buffer member which is to be heated up to 200 deg.C., but instead thereof, there may be used a sheet made of, for example, Teflon (Trade Name) or silicon rubber. Further, if the pressing is carried out in a room temperature or the like, a PET film, a polyethylene film or NBR which has a low heat resistance may be used.

Further, although, in this embodiment, the buffer zone 13-1 is formed by punching a single film, there may be used a two layer structure as another buffer structure using a conveying film as the second buffer zone 13-2, as shown in FIGS. 4a, 4b which are a top view and a side vide, the buffer zones 13-2 being formed the film.

Figure 6:
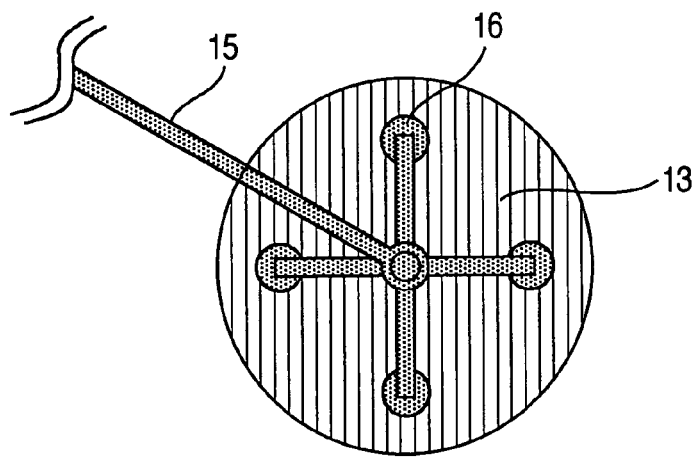
FIG. 6 is a top view illustrating another automatic buffer replacing mechanism.

Further, as another example of the automatic buffer replacing mechanism, a robot arm type automatic buffer replacing mechanism may be used, as shown in FIGS. 5 and 6 which are sectional and top views, having an arm 15 incorporating a vacuum chuck 16 and coupled to a support shaft outside of the vacuum chamber. This mechanism extracts a used buffer member attracted thereby from the vacuum chamber after transcription so as to replace a new buffer member 13 which is set to a predetermined position within the chamber.

REFERENCE EXAMPLE 1

Next, specific explanation will be made of a method of transferring a fine structure with the use of the above-mentioned apparatus. At first, a sample to be transferred was prepared in such a way that varnish in which polystyrene 679 (A&M polystyrene) was dissolved by 10% in ethylene glycol monoether acetate was prepared, and an Si substrate having a thickness of 5 μm and a size of 5 in., was spin-coated thereon with the varnish, and was then prebaked at a temperature of 90 deg.C. for 5 min., so as to obtain the sample formed thereon with a polystyrene layer having a thickness of 500 μm. Next, this sample was set on the buffer member 13 at a concentric position in the center part of the stage 4.

Next, an Ni mold 7 having a pattern forming area formed by Ni plating in a surface having a diameter 4 in., an external shape with a diameter of 8 in., and a thickness of 100 μm, and formed therein with fine concavities and convexities of nm order was set on the sample 8 located on the buffer member 13. Although the mold was set on the sample after the sample was set in this reference example, the mold and the sample having been previously positioned at different positions, may be set on the buffer member. Further they may be used such a manner that the mold is fixed to the head in the apparatus, and only sample is set on the buffer member.

Then, the vacuum chamber 9 was closed and was then evacuated by a rotary pump up to a vacuum pressure of 0.1 torr.

Then, the sample was heated up to a temperature of 200 deg.C., and was pressed by a pressure around 10 MPa, being held for 10 min.

Next, the stage 4 is cooled down to 100 deg.C., and the chamber was opened to the atmosphere.

Next, the sample 8 was fixed to the stage 4 by the vacuum chuck through the intermediary of the buffer member 13 while the mold 7 was fixed to the head, and thereafter, the stage 4 was lowered at a speed of 0.1 mm/s so as to separate the mold 7 and the sample 8 from each other.

With the process stated above, the pattern was transferred onto the surface of the sample 8 from the mold 7. Then, by observing the transferred pattern with the use of a SEM, it was found that the pattern configuration was precisely transferred. By carrying out the transcription with the use of the fine structure on the mold, stress concentration in an end part of the sample can be prevented so as to uniformly apply a pressure only over the concave and convex area of the mold with the use of a buffer member which is smaller than the external shape of the sample but greater than the concave and convex area of the mold as in this reference example, thereby it is possible to enhance the accuracy of transcription. By successively and automatically replacing the buffer members having been deformed by heating and pressing with a new one, unevenness among samples was decreased.

Although the buffer member is interposed between the sample and the mold in this embodiment, it is also effective to locate the buffer member between the mold and the head, other than the above-mentioned location. Further, even though two buffer members are be located respectively between the stage and the sample and between the mold and the head, it is possible to exhibit the technical effects and advantages of the present invention.

It is noted that although the nanoprint apparatus in this reference example is of such a type that the mold is heated for transcription after the sample is heated and melted, the present invention is also effective in such a way that a mold made of a light transparent material such as quartz is used, instead of the Ni mold, and a substrate is coated thereover with photo-sensitive liquid resin, and is then pressed at a room temperature, photo-exposed and cured in order to form a pattern.

REFERENCE EXAMPLE 2

Figure 7:
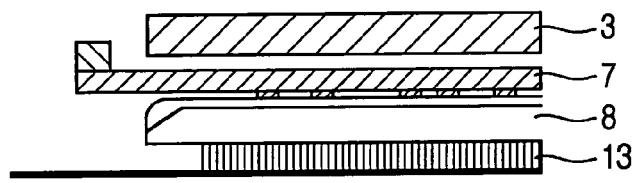
FIG. 7 is a partially sectional view illustrating an example using an Si substrate tapered outward of the substrate from one end of the surface thereof.

With the use of an apparatus similar to that used in the reference example 1, the pattern was transferred from the mold to the sample. At this stage, an Si substrate shown in FIG. 7, as the sample 8, which was tapered outward on its outer end surface part, within a zone inward from the outermost periphery thereof by a distance of 3 mm was used. This substrate was spin-coated thereover with polystyrene varnish similar to that in the reference example 1, so as to form a resin layer. Swelling of resin caused in the peripheral part of the substrate due to a normal surface tension was eliminated. This substrate was transferred thereto with a pattern with process steps similar those in the reference example 1.

By observing this transferred pattern with the use of an SEM, it was found that the configuration of the mold was precisely transferred. By carrying out the transcription with the use of the fine structure on the mold, stress concentration in an end part of the sample can be prevented so as to uniformly apply a pressure only over the concave and convex area of the mold with the use of a buffer member which is smaller than the external shape of the sample but greater than the concave and convex area of the mold as in the reference example 1, thereby it is possible to enhance the accuracy of transcription. Further, by tapering the end part of the substrate as in this reference example, the swelling of resin caused in the peripheral part of the sample can be eliminated, and accordingly, non-uniform contact with the mold can be improved so as to make the transcription satisfactory. Further, by successively and automatically replacing the buffer members deformed by heating and pressing, with new one, unevenness among samples was decreased.

REFERENCE EXAMPLE 3

Figure 8:
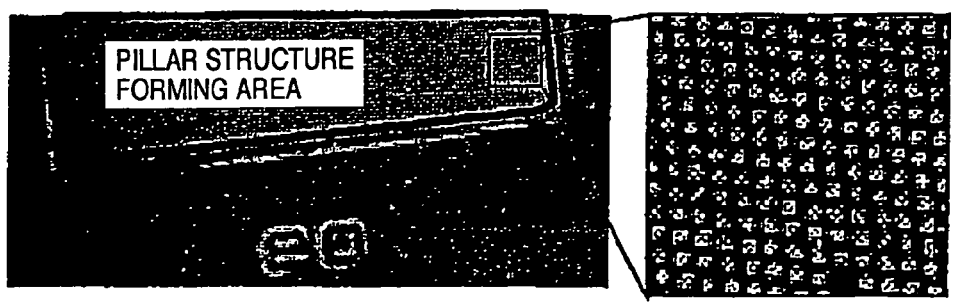
FIG. 8 is a view illustrating a surface of a pillar structure observed by a microscope.
Figure 9:
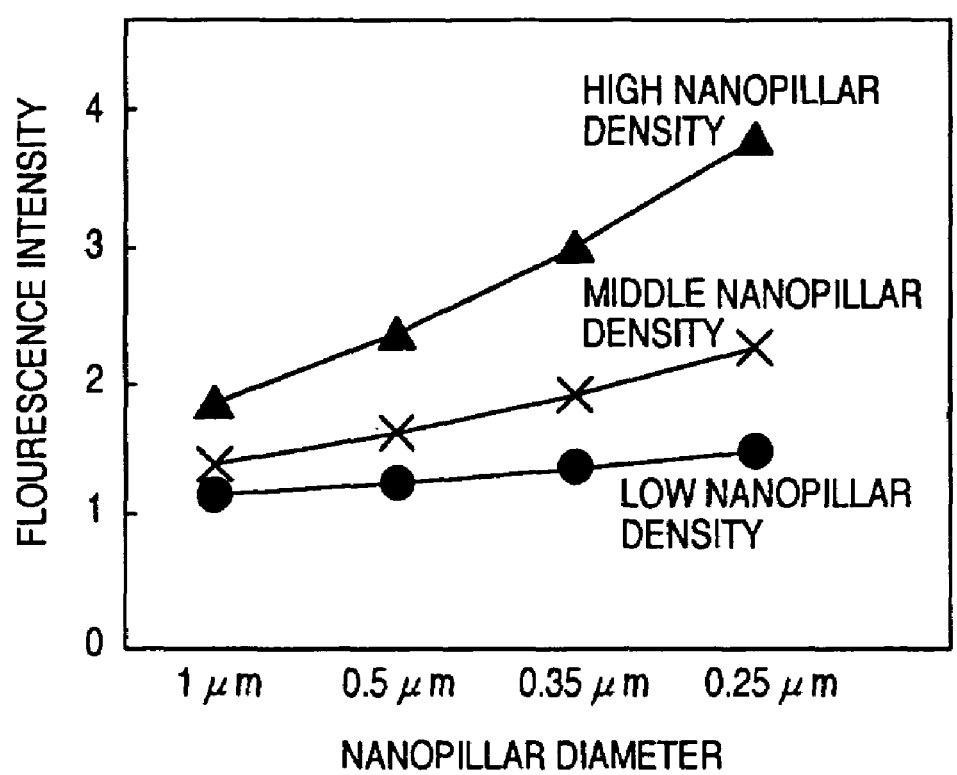
FIG. 9 is a view for explaining a relationship between the emission intensity, and the diameter and height of a casting structure.

An apparatus, a sample and process steps similar to those in the reference example 1 were used so as to form a pillar structures having a diameter of 1 µm, 0.5 µm, 0.35 µm and 0.25 µm and having a height of 1 µm, on the sample. Antibody (FITC-Albumin) with fluorescent substance was dripped by a volume of 100 µl onto the surface of the sample formed with the pillar structure in an area where the prismatic structures are formed. 5 minutes later, the sample was washed by water and was then dried. By observing the surfaces of the pillar structures with the use of a fluorescent microscope incorporating a filter capable of transmitting wavelengths around 518 nm while irradiating ultraviolet radiation onto the sample. The result is shown in FIG. 8, a fluorescent microscopic photograph being shown in the left hand part and the enlarged photograph being shown in the right hand part. As clearing understood from FIG. 8, the area where the pillar structures were formed emits white fluorescence. The relationship between the diameter and the height of the pillar structures was examined with respect to the intensity of florescence, and as a result, it was found as shown in FIG. 9. From this result, that the intensity of fluorescence was different depending upon a density and a thickness of the pillar structures.

Usually, in the case of determining whether the pillar structure not greater than 1 µm is uniformly formed or not, the observation should be made with the use of an SEM. Since irradiation of an electron beam is required for observation with the SEM, a sample made of resin or the like would be damaged during observation with the SEM. Further, the sample has to be observed in an atmosphere of vacuum, and accordingly, it is time-consuming. On the contrary, the applicants have understood that the degree of formation of the pillar structures could be conveniently and high-sensitively determined with the use of the above-mentioned phenomenon. That is, strong and uniform fluorescence can be observed in an area where the pillar structure is completely formed while uneven fluorescence and lowered intensity of fluorescence are observed in an area where defects and inferior patterns are caused. Accordingly, by observing such an intensity of fluorescence and a pattern, it is possible to evaluate the degree of formation of a fine pillar structure under the atmosphere without observation with using the SEM.

COMPARISON EXAMPLE

With the use of a nanoprint apparatus and a sample similar to those in the reference example 1, a pattern was transferred by the following process.

A polyimide film having a diameter of 6 in, which was larger than the external shape of the sample, and a thickness of 50 µm was laid as a buffer member on the stage. Then, the sample similar to that in the reference example 1 was set on the buffer member. After the sample was set, the vacuum chamber 9 was closed and then evacuated by a rotary pump up to a value not greater than 0.1 torr. Next, the sample was heated up to a temperature of 200 deg.C., and then pressed by 10 MPa, and thereafter, it was held for 10 min. Next, the sample was fixed to the stage by the vacuum chuck for 10 min. through the intermediary of the buffer member. Next, the stage was forced into cooling down to a temperature of 100 deg.C., and thereafter the chamber was opened to the atmosphere. Then, the sample was fixed to the stage by the vacuum chuck through the intermediary of the buffer member while the mold was fixed to the head, and then the stage was lowerd at a speed of 0.1 mm/sec in order to separate the sample and the mold from each other.

By observing the nanoprint sample in this comparison example with the use of an SEM, a deep impression was observed in the outer peripheral part of the sample, and a defect in a transferred pattern was found in a part of the pattern concave and convex area.

[Example of Application of the Invention]

Explanation will be made of couples of fields to which the nanoprinting with the use of a mold through the intermediary of the buffer member according to the present invention is preferably applied.

Embodiment 2: Bio (immuno) Chip

Figure 10:
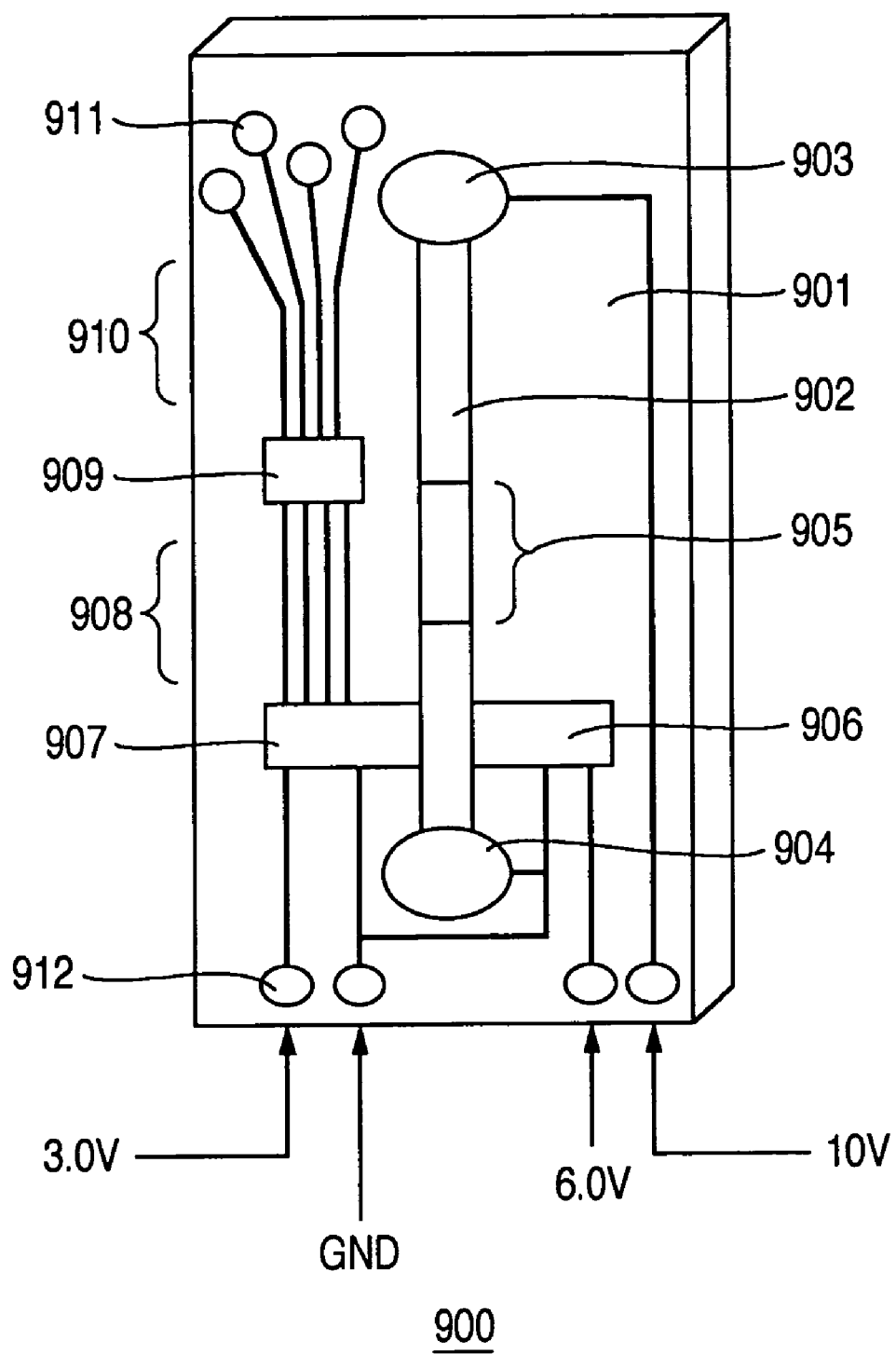
FIG. 10 is a schematic view illustrating a biochip.

Referring to FIG. 10 which is a schematic view illustrating a biochip 900, a glass substrate is formed therein with a channel 902 having a depth of 3 µm and a width of 20 µm is formed in a glass substrate 901. With this configuration, specimen containing therein DNA (deoxyribonucleic acid), blood, protein and the like is introduced into an entry hole 903, and after flowing through the channel 902, the specimen was then discharged from a discharge hole 904. The channel 902 is provided therein with a molecular filter 905 formed therein a group of protrusions having a diameter from 250 to 300 nm and a height of 3 µm.

Figure 11:
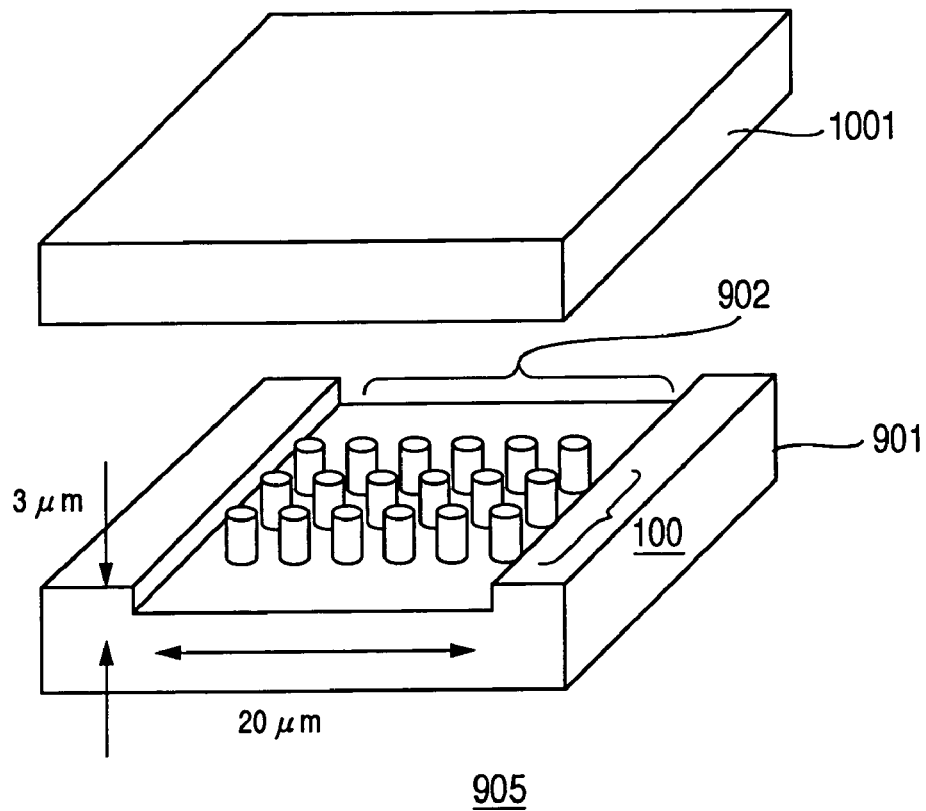
FIG. 11 is a perspective view illustrating a part in which a molecular filter of a biochip is formed.

Referring to FIG. 11 which is a perspective view illustrating a part around a place where the molecular filter 905 is formed. The substrate 901 is formed therein with the channel 902 which is in turn formed in a part thereof with a group of protrusions 100. The substrate 901 was covered with an upper substrate 1001. Thus, the specimen travels through the channel 902. For example, in the case of analysis of a chain length of the DNA, during cataephoresis of the specimen containing the DNA through the channel 902, the DNA is decomposed with high resolution by the molecular filter 905 in accordance with its chain length thereof. The specimen having passed through the molecular filter 905 is irradiated thereto with a laser beam emitted from a semiconductor laser 906 mounted on the surface of the substrate 901. Since the incident angle of the laser beam onto an optical detector 907 is decreased by about 4% each time when the DNA passes, the chain length of the DNA can be analyzed in accordance with an output signal from the optical detector 907. A signal detected by the optical detector 907 is delivered to a signal processing chip 909 by way of signal wiring 908. The signal processing chip 909 is connected thereto with signal wiring 910 which is then connected to an output pad 911 connected thereto with an external terminal. It is noted that electric power is fed from a power source pad 912 installed on the surface of the substrate 901.

Figure 12:
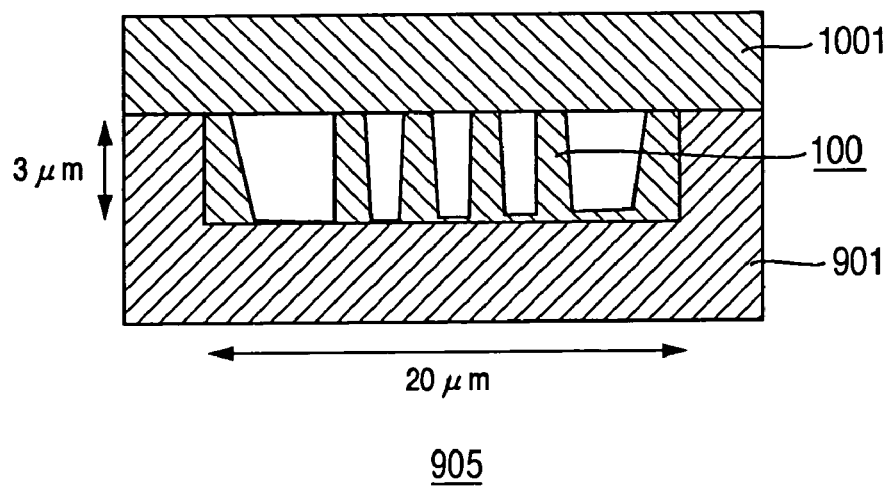
FIG. 12 is a sectional view illustrating a molecular filter.

Referring to FIG. 12 which is a sectional view illustrating the molecular filter 905 in this embodiment, the molecular filter 905 is composed of the substrate 901 having a recess in which a plurality of protrusions formed, and the upper substrate 1001 formed so as to cover the substrate 901. It is noted here that the distal ends of the protrusion are formed so as to make contact with the upper substrate. Since the main component of the group 100 of protrusions is inorganic, the protrusions may be deformed, and accordingly, it is possible to prevent the protrusions from being damaged even though the channel 902 is covered thereover with the upper substrate 1001. Thus, the upper substrate 1001 and the group 100 of protrusions can be made into close contact with each other. With this configuration, the specimen is prevented from leaking through gaps between the protrusions and the upper substrate 1001, and accordingly, highly sensitive analysis can be carried out. Actually, it was found that the analysis of a length of a DNA was carried out, and as a result, the organic protrusions exhibited that a resolution of base pairs could be improved by 3 base pairs in a half value width in comparison with the group 100 of glass protrusions which exhibited a resolution of 10 base pairs in a half value width. Although the protrusions are made into direct contact with the upper substrate in the molecular filter in this embodiment, there may be formed such a configuration the upper substrate is formed thereon with a film made of the same material as that of the protrusions, and the protrusions are made into contact with this film, thereby it is possible to aim at enhancing the tightness therebetween.

It is noted that although the single channel 902 is formed in this embodiment, a plurality of channels 902 having different sizes may be formed in order to carry out different analyses at the same time.

Further, although the DNA as the specimen is analyzed, any specific sugar chains, protein or antibody may be analyzed by previously modifying the surfaces of the group 100 of the projections with molecular which reacts with the sugar chains, protein or antibody. Thus, by modifying the surfaces of the protrusions with antibody, it is possible to enhance the sensitivity of the immunoanalysis.

With the application of the present invention to the biochip, there may be offered such an advantage that analysis protrusions having a diameter in a nano-order and made of organic materials can be conveniently formed. Further, by controlling concavities and convexities on a mold surface and the viscosity of the organic material, there may be offered such an advantage that the positions, diameters and height of the organic protrusions can be controlled. Thereby it is possible to provide an microchip for highly sensitive analysis.

Embodiment 3: Multilayer Wiring Substrate

Figure 13A:
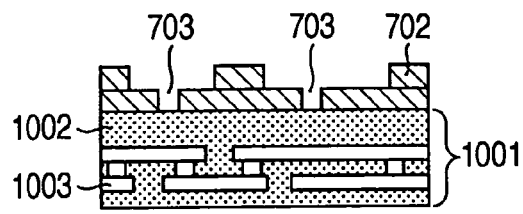
Figure 13G:
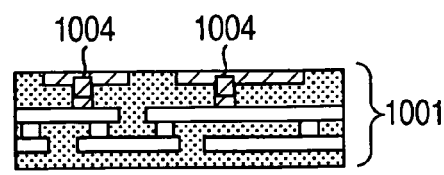
Figure 13B:
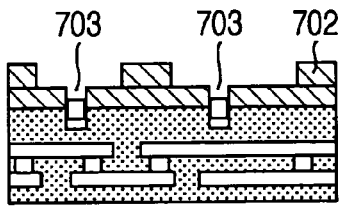
Figure 13H:
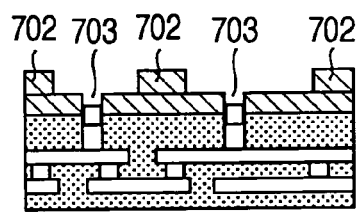
Figure 13C:
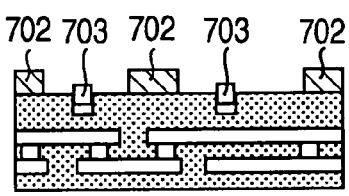
Figure 13I:
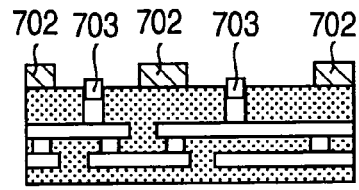
Figure 13D:
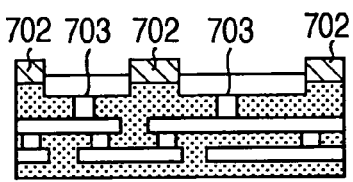
Figure 13J:
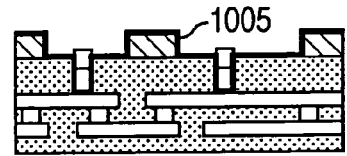
Figure 13E:
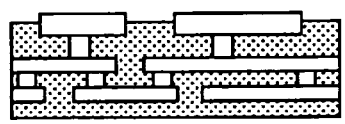
Figure 13K:
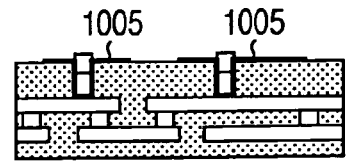
Figure 13F:
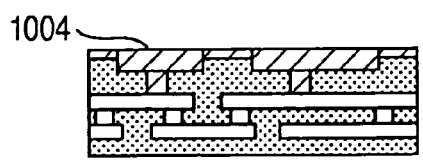
Figure 13F:
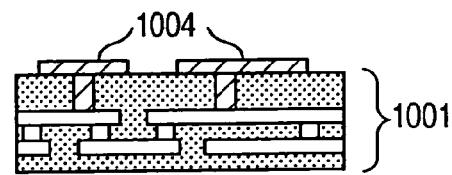

Referring to FIGS. 13a to 13l which are views for explaining process steps for producing a multilayer wiring substrate, as shown in FIG. 13a, after a resist 701 is formed on the surface of a multilayer wiring substrate 1001 composed of a silicon oxide film 1002 and copper wirings 1003, pattern transcription is carried out by a mold (which is not shown). Next, exposed zones 703 in the surface of the multiplayer wiring substrate 1001 are dry-etched by $CF_4/H_2$ gas so that the exposed zones 703 in the surface of the multilayer wiring are formed into a channel-like configuration as shown in FIG. 3b. Then, by resist-etching the resist 702 with RIE so as to remove the resist in parts having low step heights, enlarged exposed zones 702 are formed, as shown in FIG. 13c. In this condition, the exposed zones 703 are dry-etched until the depth of the channels previously formed reaches the copper wirings 1003, and accordingly, a configuration shown in FIG. 13d is obtained. By removing the resist 702, the multilayer wiring substrate 1001 having a channel configuration on its surface is obtained as shown in FIG. 13e. After a metal film (which is not shown) is formed on the outer surface of the multilayer wiring substrate 1001 by sputtering in this condition, electric plating is carried out so as to form a metal plating film 1004 as shown in FIG. 13f. Thereafter, the metal plating film 1004 is polished until the silicon oxide film 1002 is exposed from the multilayer wiring substrate 1001, and accordingly, the multilayer wiring substrate 1001 having metal wirings on its surface can be obtained as shown in FIG. 3g.

Further, explanations will be hereinbelow made of another process steps for producing a multilayer wiring substrate. In the case of dry-etching the multilayer wiring substrate 1001 in the condition shown in FIG. 3a, the etching is continued until the copper wirings 1003 are exposed from the multilayer wiring substrate 1001 so as to obtain a configuration shown in FIG. 13h. Next, by etching the resist 702 with RIE so as to remove the resist in parts having low step heights, a configuration shown in FIG. 13j is obtained. Then the resist 702 is removed by lift-off so as to obtain a configuration shown in FIG. 13k. Next, electroless plating is carried out with the use of the remaining metal film 1005 so as to form a configuration as shown in FIG. 13l.

With the application of the present invention to the multilayer wiring substrate, wirings having a high degree of dimensional accuracy can be obtained.

Embodiment 4: Magnetic Disc

Figure 14:
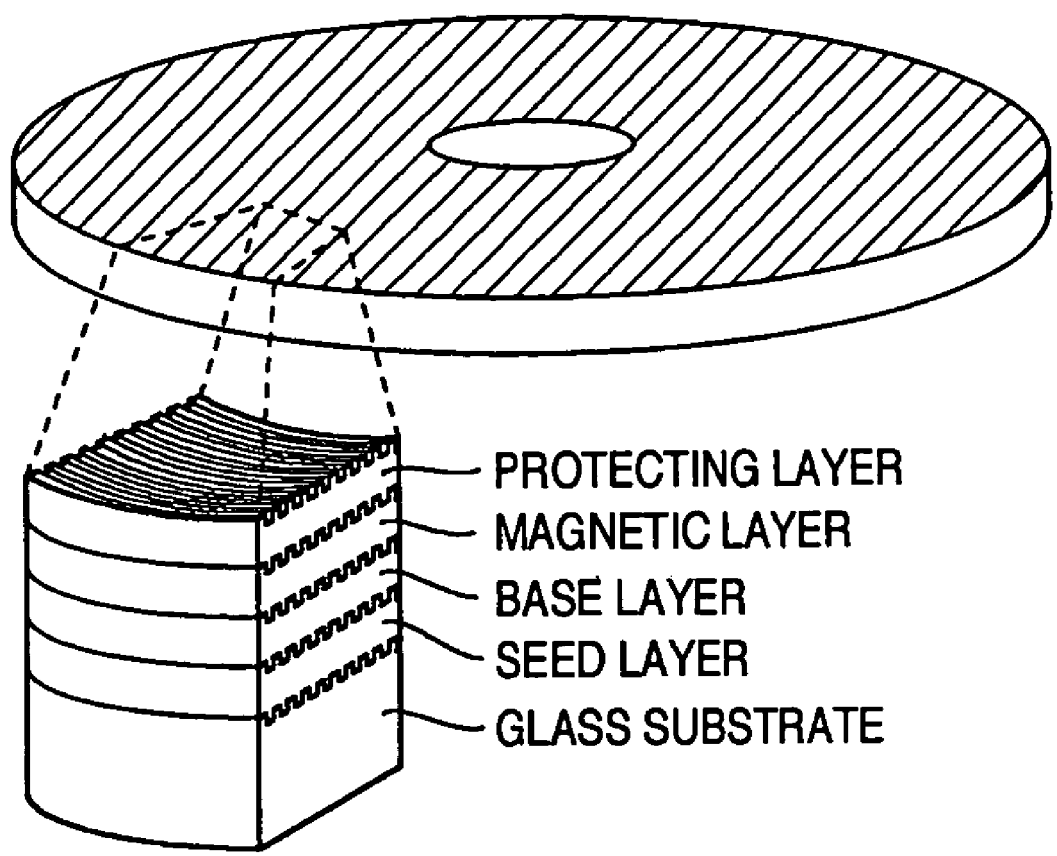
FIG. 14 is a perspective view illustrating a magnetic recording medium with a part thereof being extracted and enlarged.
Figure 15A:
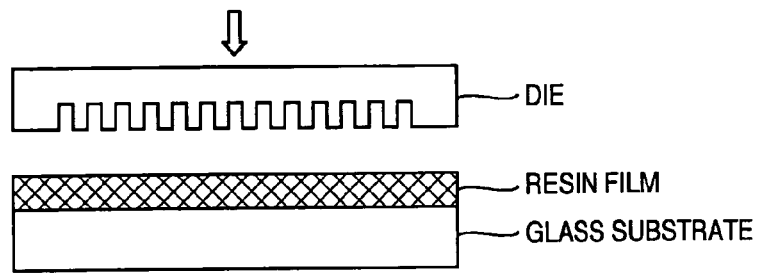
FIGS. 15a to 15f are radially sectioned views for explaining a process of forming concavities and convexities on a glass substrate with the use of the nanoprint method.
Figure 15B:
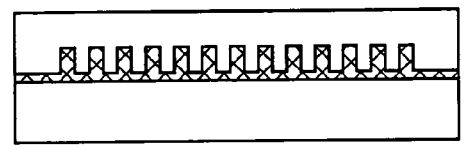

Referring to FIG. 14 which is a perspective view illustrating a magnetic recording medium with a partly enlarged view, a substrate is formed of glass having fine concavities and convexities. The substrate is formed thereon with a seed layer, a base layer, a magnetic layer and a protecting layer in the mentioned order. Explanation will be hereinbelow made of a method of producing a magnetic recording medium in this embodiment with reference to FIGS. 15a to 15f which are radially sectioned views for explaining process steps of forming concavities and convexities in a glass substrate with the use of a nanoprinting process. At first, a glass substrate is prepared. Soda lime glass is used for the glass substrate in this embodiment. However, this embodiment should not be limited to this glass if the material has a flat surface, but another glass substrate made of materials including aluminum silicate glass, and metal substrates made of materials including Al may be used. Further, a resin film is formed with the use of a spin coater so as to have a thickness of 200 nm as shown in FIG. 15a. PMMA (polymethylmethacrylate) is used as the resin.

Figure 15C:
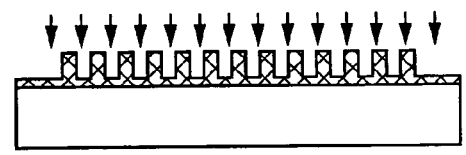
Figure 15D:
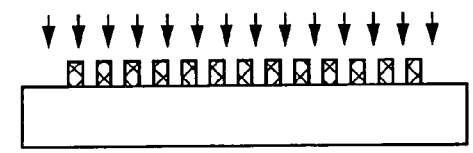
Figure 15E:
Figure 15F:

Meanwhile, as a die, an Si wafer formed thereon grooves concentric with a center hole in a magnetic recording medium is prepared. The groove has dimensions, that is, a width of 88 nm, a depth of 200 nm and a space of 110 nm between adjacent grooves. Since the concavities and convexities in the die are very fine, the grooves are formed by photolithograpy using an electron beam. Then, the viscosity of the resin is lowered by heating it up to a temperature of 250 deg.C., and then the die is pressed thereonto. By parting the die from the resin at a temperature not greater than the glass transition point of the resin, concavities and convexities which are complementary with those of the die are formed as shown in FIG. 15c. With the use of a nanoprinting process, a pattern having a structure which is shorter than visible light wavelengths, that is, having dimensions which exceeds the limit of possible exposure of photolithography can be formed. Further, with dry-etching, the film remaining in the bottom parts of the resin pattern is removed so as to obtain a pattern shown in FIG. 15d. With the use of this resin film as a mask, by etching the substrate with florinated acid, a substrate shown in FIG. 15e can be formed, and by removing the resin with separating liquid, grooves having a width 110 nm and a depth of 150 nm are formed as shown in FIG. 15f. Thereafter, a seed layer made of NiP is formed on the glass substrate by electroless plating. Although, in a conventional magnetic disc, a NiP layer is formed by a thickness of not less than 10 µm, the thickness of this layer is set to be not greater than 100 nm in this embodiment since a fine concave and convex configuration is also formed on an upper layer thereof. Further, with the use of a sputtering process which has been used for forming a conventional magnetic recording medium, a Cr base layer having a thickness of 15 nm, a CoCrPt magnetic layer having a thickness of 14 nm and a C protecting layer having a thickness of 10 nm are successively formed in the mentioned order so as to form a magnetic recording medium in this embodiment. In this embodiment, the magnetic recording medium has magnetic mediums which are radially spaced from one another by a nonmagnetic layer walls having a width of 88 nm. Thus, it is possible to enhance in-plane magnetic anisotropy. It is noted that although a concentric circular pattern forming process by a polishing tape (texturing) has been conventionally well-known, this process offers large pattern intervals with a micron scale, and accordingly, this process can hardly be used for producing a high density recording medium. The magnetic recording medium in this embodiment can ensure a magnetic anisotropy with a fine pattern by using the nanoprinting process, and can have a high density of 400 Gb/cm$^2$. It is noted that the pattern formation by the nanoprinting should not be limited to the one formed therein with nonmagnetic isolation walls in a circumferential direction, but the one formed therein with nonmagnetic isolation walls in a radial direction may be also formed. Further, the effect exhibited by the magnetic isotropy as stated in this embodiment should not be specifically limited by materials of the seed layer, the base layer, the magnetic layer and the protecting layer.

Embodiment 5: Optical Guide Wave Path

In this embodiment, explanation will be made of an example in which an optical device for changing the traveling direction of an incident light beam is applied in an optical data processing apparatus.

Figure 16:
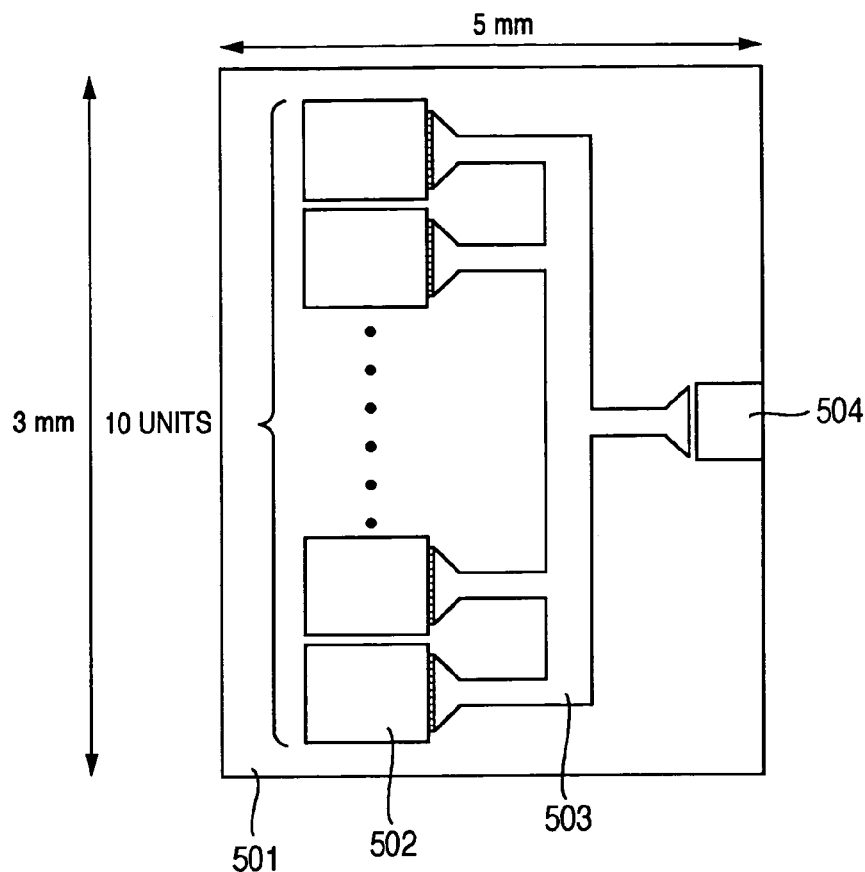
FIG. 16 is a block diagram illustrating an optical circuit 500.

Referring to FIG. 16 which a schematic view illustrating a configuration of a fabricated optical circuit 500, this optical circuit 500 is composed of a substrate made of aluminum nitride and having a longitudinal length of 30 mm, a crosswise length of 5 mm and a thickness of 1 mm which is formed thereon with ten transmission units 502 each composed of an indium group semiconductor laser and a drive circuit, an optical guide wave path 503 and an optical connector 504. It is noted that the wavelengths of transmission signals from the ten transmission units 502 are different from one another by every 50 nanometers, that is, this optical circuit 500 is a base component of a device of an optical multiplex communication system.

Figure 17:
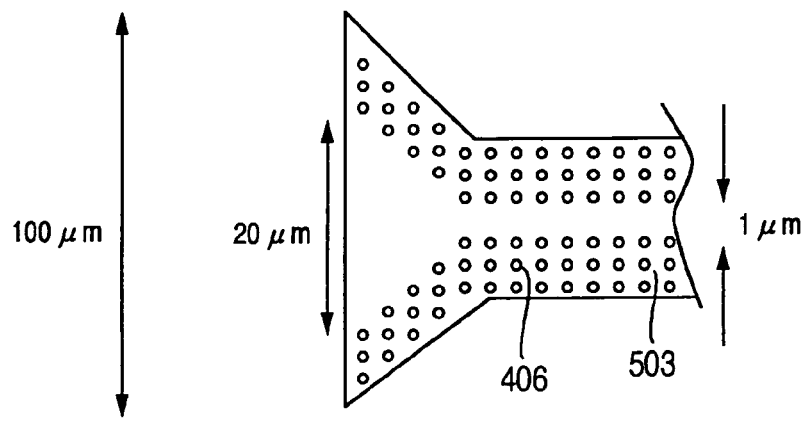
FIG. 17 is a schematic view illustrating protrusions in an optical waveguide.

Referring to FIG. 17 which is a schematic layout view illustrating protrusions 406 in the optical guide wave path 503, one end part of the optical guide wave path 503 is flared having a width of 20 µm in order to allow an alignment error between the transmission unit 502 and the wave guide path 503 so that an optical signal is led into a zone having a width of 1 µm by a photonic band gap. It is noted that the protrusions 406 are arranged at intervals of 0.5 µm, although the protrusions are shown by a number which is less than the actual number in FIG. 17.

The optical circuit 500 can deliver ten optical signals having different kinds of wavelengths in a superposed condition. Since the optical traveling direction can be changed, the crosswise width of the optical circuit 500 can be decreased to a very short length, thereby it is possible to offer such an advantage that the optical communication device can be miniaturized. Further, since the protrusions 406 can be formed by press molding, it is also possible to offer such an advantage that the manufacturing cost thereof can be reduced. Although explanation has been made of the optical device in which the inlet optical beams are superposed with each other, it is clear that the optical guide path 503 is effectively used for all optical guide paths for controlling an optical path.

With the application of the present invention to the optical wave guide path, it is possible to cause an optical signal to travel through a structure in which protrusions mainly made of organic substance are periodically arranged in order to change its traveling direction. Further, the protrusions can be formed by a convenient production technology using press molding, thereby it is possible to provide such an advantage that an optical device can be produced at a low cost.

[Advantages of the Invention]

According to the present invention, there is provided a nanoprint apparatus in which a substrate and a mold formed at its surface with fine concavities and convexities are heated and pressed with each other through the intermediary of a buffer member therebetween, wherein a plurality of buffer members are held on a conveying film, and a mechanism for successively replacing the buffer member with one of the plurality of buffer members upon heating and pressing, thereby it is possible to enhance the in-plan uniformity of a pattern, and to automatically replace the buffer members. Thus it is possible to carry out transcription with a high degree of accuracy.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A nanoprint apparatus for forming a fine structure on a substrate, in which the substrate and a mold, having formed on a surface of the mold fine concavities and convexities, are heated and pressed to each other through the intermediary of a buffer member, characterized by a mechanism for successively replacing the buffer member with new one after heating and pressing, and
    wherein said buffer member is interposed between said mold and a head having a press surface, adjacent a surface of the mold, having opposite to the surface of the mold having fine concavities and convexities, or is interposed between the substrate and a stage for carrying the substrate.

2. A nanoprint apparatus as set forth in claim 1, characterized in that the buffer member is larger than a pattern forming area of the mold, but smaller than an external shape of the substrate and the external shape of the mold.

3. A nanoprint apparatus as set forth in claim 1, wherein said buffer member is made of a material selected from the group consisting of polyimide, polytetrafluoroethylene and silicone rubber.

4. A nanoprint apparatus as set forth in claim 1, wherein said buffer member is made of a material selected from the group consisting of polyethylene terephthalate, polyethylene and acrylonitrile butadiene rubber.

5. A nanoprint apparatus as set forth in claim 1, wherein said buffer member is interposed between the mold and the head.

6. A nanoprint apparatus as set forth in claim 1, wherein said buffer member is positioned interposed between the substrate and said stage for carrying the substrate.

* * * * *